Aug. 22, 1967  E. A. PROCTOR  3,337,260
SAFETY SEATS FOR VEHICLES
Filed June 3, 1964  5 Sheets-Sheet 1

Edward Augustus Proctor

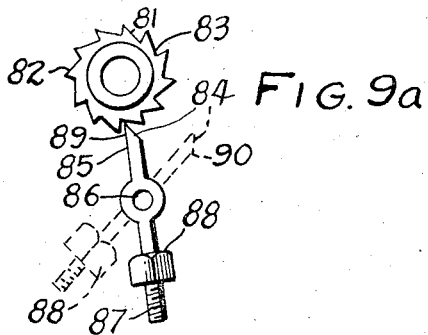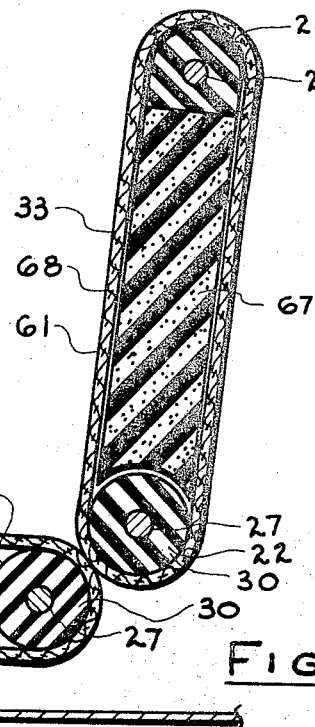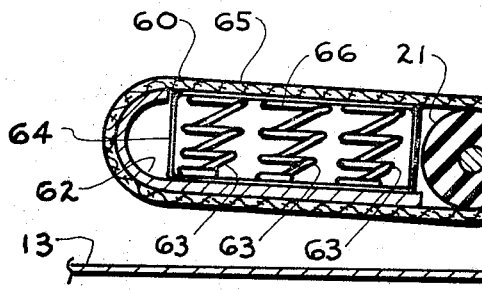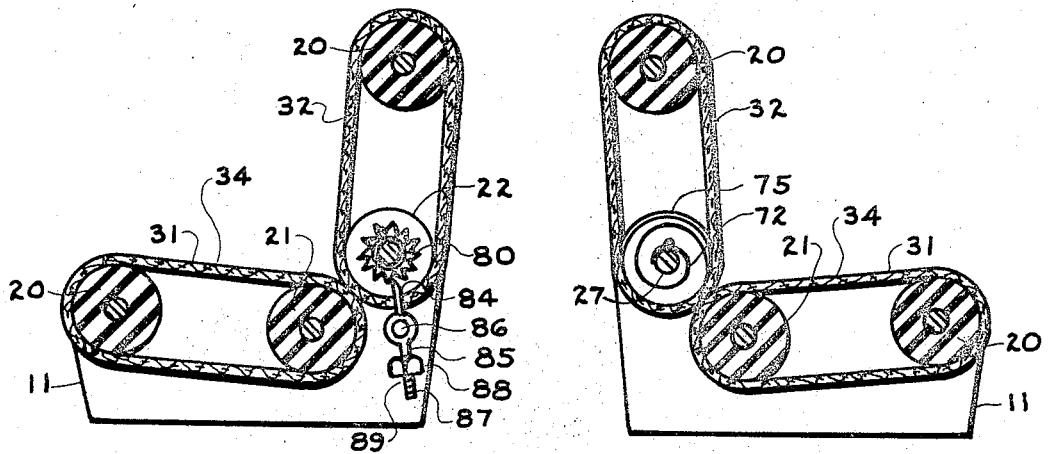

*Edward Augustus Proctor*

Aug. 22, 1967   E. A. PROCTOR   3,337,260
SAFETY SEATS FOR VEHICLES
Filed June 3, 1964   5 Sheets-Sheet 5
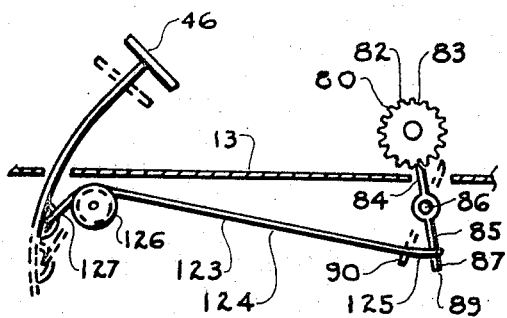
F I G. 13
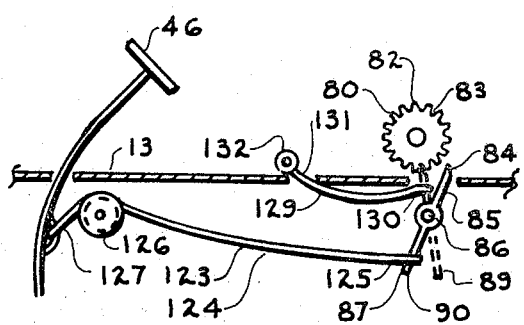
F I G. 14
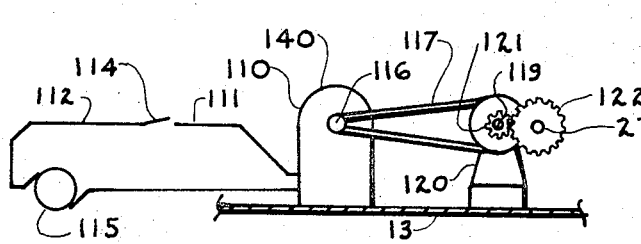
F I G. 12
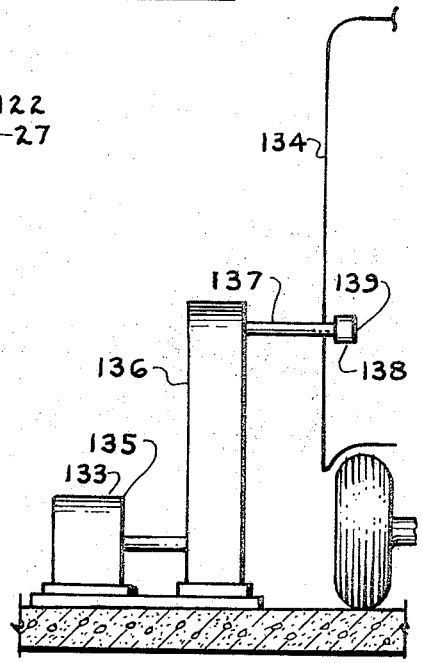
F I G. 15
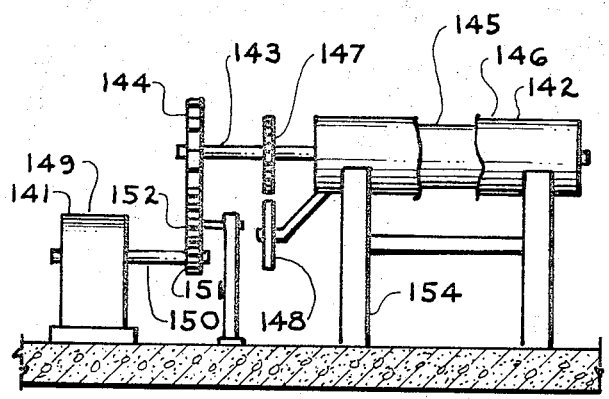
F I G. 16
Edward Augustus Proctor   INVENTOR.

3,337,260
SAFETY SEATS FOR VEHICLES
Edward Augustus Proctor, 2888 Meadowbrook Blvd.,
Cleveland Heights, Ohio 44118
Filed June 3, 1964, Ser. No. 372,278
8 Claims. (Cl. 296—65)

In general my invention concerns improvements in safety seats for both civilian passenger vehicles and for military vehicles.

Civilian passenger vehicles while in motion are upon occasions involved in emergency stops and collisions. During emergency stops and collisions the driver is unable to maintain his observational sitting posture and also maintain his control of the steering wheel even though he is secured with a safety belt. During emergency stops and collisions wherein the vehicle is subjected to emergency de-acceleration civilian passengers are often thrown from their seats and as a result are killed or are seriously injured.

My safety seat will restrain passengers from diving off their seats during emergency de-acceleration due to emergency stops and collisions thus protecting them from injury and death. My safety seat will restrain a vehicle driver within his normal observational sitting posture, while he maintains control of his steering wheel during any emergency stop or collision.

The driver of military vehicles is faced with the problem of driving speeding vehicles over very rough terrain. A stretch of rough terrain often occurs inconspicuously within a generally smooth terrain. The driver of the military vehicle has neither the required time to slow down or the occasion to avoid any encountered inconspicuous rough terrain. It is very essential that the driver of the military vehicle have full control of his vehicle at all times even though his vehicle is bouncing over rough terrain. When the driver can maintain control of the military vehicle while encountering rough terrain, the vehicle will generally proceed over the rough terrain. When the driver loses control of his vehicle as it encounters rough terrain the vehicle generally falters and becomes wrecked since the front wheels are diverted from the forward path of the vehicle.

I have mentioned the driver of the military vehicle encountering a rough terrain. A civilian driver encountering an emergency de-acceleration due to an emergency stop or a collision is often subjected to a similar condition wherein the driven vehicle passes over some obstruction such as a street curb, prostrate body, a disassembled portion of another vehicle or a dislodged cargo.

It is quite obvious that a passenger secured by a seat belt, whether the driver or not, is subjected to an intense whipping action during an emergency de-acceleration due to an emergency stop, collision or passage over a rough terrain. This whipping action is detrimental to both the driver and the other passenger, because it results in an unusual and severe physical exertion to which the human body is unaccustomed and incapable of withstanding without damage. It has already been pointed out that this whipping action causes the driver to lose control of his observational sitting posture and his grip on the steering wheel.

The ordinary seat belt restrains a passenger at his centrally pivoted section, namely, at his hip area. The passenger's upper torso, including his midsection, chest, shoulders, arms, neck and head is free to whip forward freely during an emergency de-acceleration due to an emergency stop, collision, or while the vehicle passes over rough terrain.

There are passengers in other than ordinary vehicles who are subject to jostling. The occupant of a seat in a small boat such as a landing craft while plowing through a rough sea is subject to a severe jostling. The airman in a glider which makes an emergency landing is subject to a severe jostling. The automobile and speed boat racing driver is subject to severe posture strain and jostling. The rider of amusement rides is subject to similar strains and jostling. The operator of heavy construction excavating machines is subjected to severe posture strains. There are many other vehicles operating under conditions subjecting their passengers and drivers to severe posture strains.

The current ineffectual publicity now being directed toward influencing motorists to use seat belts is the major factor prompting me to develop my safety seat. I believe safety belts will never reduce injury and death to motorists to an acceptable degree.

The majority of motorists who will accept the use of seat belts will not use seat belts on all occasions at all times.

Many motorists will never use seat belts because of the inconvenience encountered in their use. Many motorists will never use seat belts because they abhor the psychological feeling of being "tied down." Many persons will never use seat belts because their mind is too fully occupied with the trials and troubles of life to be fully mentally awake and aware of the need for using a seat belt at all times. For seat belts to be effective they would have to be installed in every vehicle and be used by all motorists at all times.

My vehicle safety seat automatically confines the seated motorist without conscious or unconscious effort or cooperation by the motorist. The motorist does not have to fasten, adjust or position any single device or gadget. The only cooperation required to make my invention function effectively is that the motorist sit on the seat in a normal manner. There is no feeling of being "tied down" experienced by the motorist during normal operation of the vehicle. My vehicle safety seat confines the motorist to his seat only during short intervals when the vehicle is rapidly de-accelerating which I call emergency de-acceleration due to an emergency stop or a collision, or while the vehicle is passing over a stretch of rough terrain.

An object of this invention is to save lives and prevent injury and suffering to people involved in vehicular accidents; without requiring any effort or cooperation from the victim himself.

My improved safety seat will protect those persons who, if they had a safety belt available, would not inconvenience themselves sufficiently to use same, and would not be sufficiently mentally awake to use same, or would not use same because of dislike of its confining nature.

A second object of this invention is to provide a means whereby automobiles and other vehicles can be safely driven in every day traffic at higher speeds than now permitted by present laws. For the automobile to continue to serve its presently assumed function in an ever accelerating society it will have to quicken its pace or be replaced by faster modes of transportation. Automotive engineers have for some time known how to incorporate more sudden and severe de-acceleration into passenger automobile operation by improving the car's braking facilities. To the present time the automobile has been denied masterful braking facilities because of its resulting effect of jostling, jolting and jarring the passenger.

Masterful braking facilities can be utilized on vehicles in conjunction with my safety seat to effect sudden stops without discomfort to the passenger. When masterful braking in conjunction with my safety seat is employed on passenger automobiles they may then be safely operated on ordinary highways at over one hundred miles per hour. an era of increased everyday automobile speed is sure to follow the adoption of my invention without endangering life and limb. Masterful braking will produce severe deacceleration, which we presently would consider as emergency de-acceleration. Years hence what we now consider as emergency de-acceleration we will learn to understand to be normal de-acceleration for vehicles.

An object of this invention is to provide facilities assisting the driver of vehicles passing over rough terrain to maintain their normal driving posture, while maintaining control of their steering wheel.

Another object of this invention is to provide facilities aiding the passenger within erratically propelled vehicles to withstand the unusually severe posture strain encountered.

A more complete understanding of my invention will follow from a description of the attached drawings wherein like parts are referred to by like reference characters and in which like reference characters refer to like parts; and wherein:

FIGURE 4 is a cross-sectional view taken along line 4—4 as shown on FIGURE 1 and looking in the direction of the attached arrows while illustrating the construction of my first alternate safety seat.

FIGURE 5 is a cross-sectional view of my second alternate safety seat taken along line 5—5 as shown in FIGURE 1 and looking in the direction of the attached arrows and illustrating that my safety seat is a spring propelled seat.

FIGURE 6 is a cross-sectional view of my second alternate safety seat taken along line 6—6 as shown in FIGURE 1 and looking in the direction of the attached arrows and further illustrating that my safety seat is a spring propelled seat.

Figure 9:
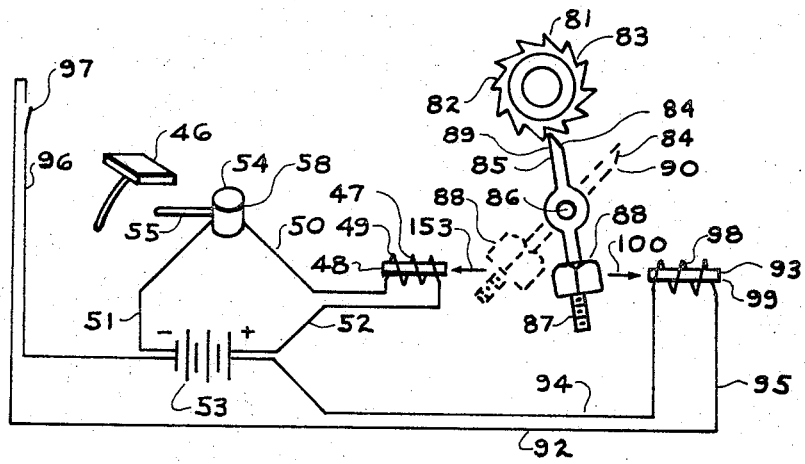

FIGURE 9 is an enlarged view of a detent wheel holding my spring motor in a non-operating condition by an engaging weighted lever in a first position until the lever is displaced to a second position by a simultaneous action of a dual means involving a momentum means and a first electro magnetic means controlled by brake pedal movement, the lever being subsequently returned to its original first position by a second electro-magnetic means involving a manually operated switch.

FIGURE 9A is an enlarged view of a detent wheel holding my spring motor in a non operating condition by an engaging lever in a first position until the lever is displaced to a second position by a momentum means accruing from an emergency de-acceleration of the vehicle.

Figure 10:
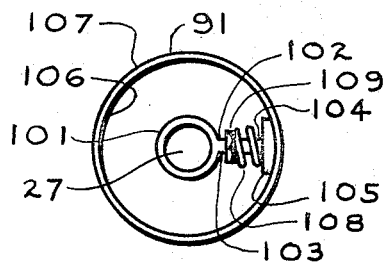

FIGURE 10 is an enlarged view showing the operation of a speed and power regulating device used on my second alternate safety seat.

Figure 11:
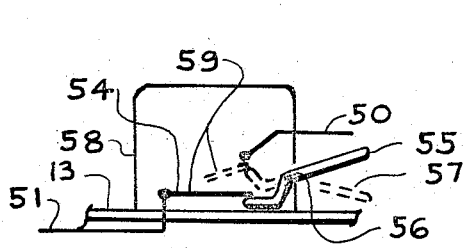

FIGURE 11 is a cross-sectional view illustrating the working parts of an electric switch operated by responsive action of a foot operated brake pedal.

FIGURE 12 is an elevational view showing an electric driving unit utilized as a second means to wind up my spring motor.

FIGURE 13 is an elevational view of means involving a flexible cable utilized for dislodgment of the pivoted lever from the detent wheel, the means being responsive to motion of the foot pedal.

FIGURE 14 is an elevational view of means involving a flexible cable utilized to re-engage the pivoted lever with the detent wheel, the means being responsive to manual control.

FIGURE 15 is an elevational view of a third means for rewinding a spring motor confined within a vehicle.

FIGURE 16 is an elevational view of fourth means for rewinding a spring motor which has been detached from and removed from a vehicle.

Figure 2:
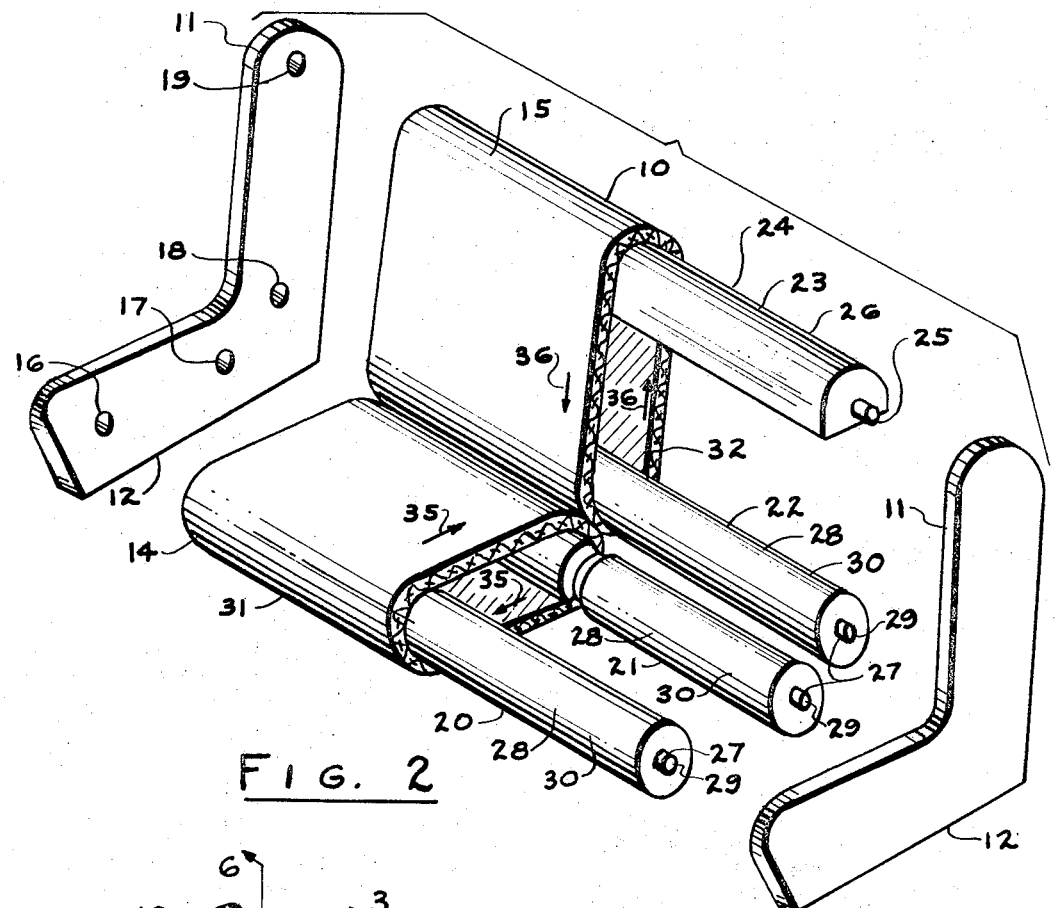
FIGURE 2 is an exploded isometric view of my preferred safety seat with cut-away portions illustrating various parts.
Figure 1:
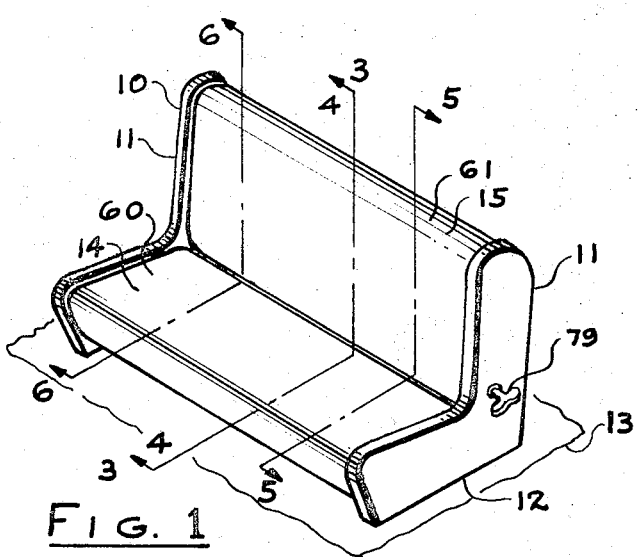
FIGURE 1 is an isometric view of my preferred and my first and second alternate safety seats.
Figure 3:
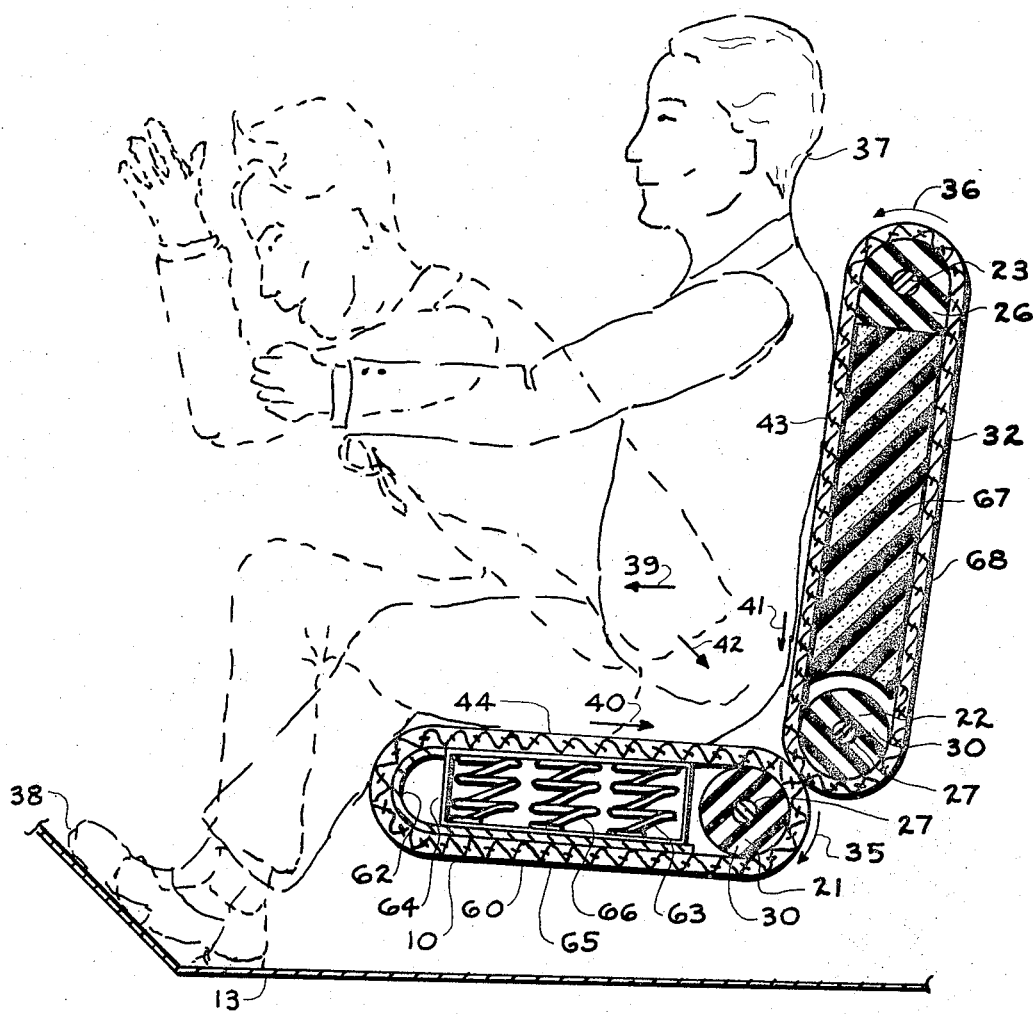
FIGURE 3 is a cross-sectional view taken along line 3—3 as shown on FIGURE 1 and looking in the direction of the attached arrows illustrating a principle of operation of preferred, first and second alternate safety seats. The operational effect of my safety seat upon an occupant of the seat is fully explained.

My preferred spring propeller safety seat 10 illustrated in FIGURES 1 and 2 while the operational effect of my spring propelled safety seat upon a seated person is amply illustrated in FIGURE 3. My preferred safety seat 10 involves two vertically positioned supports 11 spaced apart one from another. The supports 11 each have a bottom edge 12 attached to some vehicle floor 13. The supports 11 are interconnected by a nearly horizontal first seat portion 14 and by a nearly vertical first back portion 15. The seat portion meets the back portion at a first juncture.

Inspection of FIGURE 2 reveals first, second, third and fourth bearings 16, 17, 18 and 19 respectively. FIGURE 2 also shows the parallel first, second and third longitudinal rollers 20, 21, and 22 and a first longitudinal spacer bar 23. The spacer bar 23 has a central portion 24 between bar ends 25. The central portion 24 is encased by a first pliable shield 26 constructed of rubber or some similar material. The rollers 20, 21 and 22 each involve a shaft 27 having a central portion 28 between shaft ends 29. The central portion 28 is encased by a second pliable shield 30 constructed of rubber or some similar material. The rollers 20, 21 and 22 and spacer bar 23 may jointly be considered as only different embodiments of spacer elements.

The shaft ends 29 of the first, second and third rollers, 20, 21 and 22 respectively are rotatably retained by a sliding fit within first, second and third bearings 16, 17, and 18 further illustrated in FIGURE 2. The bar ends 25 of the first longitudinal spacer bar 23 are rigidly retained by a drive fit within the fourth bearing 19 illustrated in FIGURE 2.

A first endless pliable sleeve 31 enwraps, in a manner similar to a belt, the first and second rollers 20 and 21. A second endless pliable sleeve 32 enwraps, in a manner similar to a belt, the third roller 22 and first spacer bar 23. Since the rollers 20 and 21 are parallel one to another and spaced apart one from another, the first endless pliable sleeve 31 enwraps these rollers to fashion a first endless belt.

Since the third roller 22 is immediately below and parallel to while spaced apart from the first spacer bar 23, the second endless pliable sleeve 32 enwraps third roller 22 and first spacer bar 23 to fashion a second endless belt.

The second endless pliable sleeve 32 is oriented in a near vertical relationship.

The confinement of the bar end 25 of the first spacer bar 23 within the bearing 19 has been described as a rigid retainment which will not permit rotation of the spacer bar 23. When rotation is allowed for the spacer bar 23 it then acquires the function of a roller and should in such instances be constructed in a manner similar to rollers 21, 22 and 23.

Inspection of FIGURES 2, 3, and 4 illustrate how the bearings 17 and 18 are spaced a predetermined distance apart sufficient to produce an intimate contact between pliable sleeves 31 and 32 because of the predetermined spaced relationship between the pliable shields 30 of rollers 21 and 22. This contact along a contact line which becomes a second juncture is sufficiently intimate to induce a rotation of the third roller 22 through a rotation of the second roller 21.

Some directly connected stored up power means to be described later in this specification will upon being released cause the second roller 21 to rotate in a clockwise direction. The previously described intimate contact between the pliable shields 30 of the rollers 21 and 22 causes the clockwise rotation of roller 21 to impart a counter clockwise rotation to roller 22.

The clockwise rotation of roller 21 causes the first endless pliable sleeve 31 to travel in a first endless cycle having a clockwise direction as indicated by arrows 35 on FIGURES 2 and 3.

The counter clockwise rotation of roller 22 causes the second endless pliable sleeve 32 to travel in a second endless cycle having a counter clockwise direction as indicated by arrows 36 on FIGURES 2 and 3.

Inspection of FIGURE 2 illustrates that the first and second endless cycles converging toward the first juncture where the seat portion meets the back portion or converging one cycle toward the other 35 and 36 are converging cycles.

To facilitate the explanation of my invention a human body 37 is shown on FIGURE 3. A human body on the seat of a vehicle during a collision is not catapulted from the seat as is generally believed. An object is catapulted when it is propelled in a manner similar to an object being propelled by a sling shot.

A human body on the seat of a vehicle during a collision is induced to perform an unwitted dive from the vehicle seat. The feet 38 of the human body 37 are firmly positioned against an unyielding floor 13 generally at an appropriate location and slope. The firmly positioned feet 38 act as a fulcrum about which the body 38 revolves during its undesired dive as is indicated by the dotted lines. The body 38 revolves in a counter clockwise rotation about the fulcrum feet 37 due to the stored up momentum 39 being released during the severe de-acceleration at the time of collision.

The movement of the endless pliable sleeves 31 and 32 in their respective cycles 35 and 36 produces forces 40 and 41 represented by the similarly numbered arrows and acting upon the human body 37. The two forces 40 and 41 may be replaced by one resultant force 42 represented by the similarly numbered arrow and showing the combined efforts of forces 40 and 41. The resultant force 42 represents the force which restrains the body 37 representing a seated person from being induced to make a forced dive from my preferred seat 10 or within my alternate safety seats 33 and 34.

The human body 37 has a back portion 43 and a buttocks 44. The movement of the first endless pliable sleeve 31 in the first endless cycle 35 strokes the sleeve 31 against the buttocks 44 to produce the previously described frictional force 40. The movement of the second endless pliable sleeve 32 in the second endless cycle 36 strokes the sleeve 32 against the back portion 43 to produce the previously described frictional force 41.

Since frictional forces are directly dependent upon pressure between contact surfaces and since the endless pliable sleeves 31 and 32 work concurrently in harmony because of the converging cycles 35 and 36 to produce recurringly increasing pressures between the back portion 43 and sleeve 32, between the buttocks 44 and sleeve 31 and therefore increasing with compounding increments the intensity of frictional forces 40 and 41. The progressively increasing vigor of functional forces 40 and 41 work in harmony in thrusting the body 37 rearwardly and downwardly respectively against the back portion 15 and seat portion 14, thereby restraining the human body 37 against the seat 10 even though the human body 37 has within itself a momentum represented by force 39 caused by an emergency de-acceleration of the vehicle carrying the seat 10.

In other words, the converging cycles of the endless pliable sleeves 31 and 32 will develop frictional forces 40 and 41 between a human body 37 resting on the seat 10 sufficient to overcome the human body's 37 stored up momentum 39 during emergency de-acceleration of the vehicle, thus preventing the human body 37 from diving from the seat 10 about the firmly positioned feet 38.

An occupant of a seat upon becoming aware of an impending accident rears backward onto the seat firmly braces his feet against the floor. Even though he does this the impact of the collision will force him to dive from the seat. My spring propelled safety seat assists the occupant in his effort to brace himself against the seat at the itme of an accident. The stiffness of the person's legs is sufficient to withstand the shock of the impact. My seat only prevents the self braced seat occupant from diving from the seat wherein his feet act as a fulcrum during the dive.

Still another way of stating the same would be to say that the converging cycles 35 and 36 of the endless pliable sleeves 31 and 32 push a seated human body 37 simultaneously toward the seat portion 14 and back portion 15 of the safety seat 10 by means of two forces 40 and 41, each of forces 40 and 41 augment and compound the other. Since the intensity of any frictional force is proportional to the pressure exerted between the contact surfaces; the frictional force 40 is substantial due to the weight of the seated person supplying the required pressure between the contact surfaces even subsequent to the force 41 being considered to act in augmenting the pressure between the contact surface of the buttocks 44—FIGURE 3—and endless pliable sleeves—FIGURE 2—or 65—FIGURE 3.

It has been commonly known for some time that if a passenger is secured by a seat belt to a vehicle seat he cannot be thrown from the vehicle or be thrown against a portion of the vehicle during a collision or quick emergency stop. My safety seat will automatically perform the same function as a seat belt but will perform its function without any effort or cooperation by the passenger himself. In other words my safety seat will protect the passenger without him doing anything in his own behalf.

The initial starting up of my safety seat would obviously require a higher power demand than would its subsequent continuous operation demand. This would be true because of a first and second reason. The first reason accounts for only a slight increase in the initial starting power demand. The second reason accounts for a substantial increase in the initial starting power demand. The first reason involves the inertia of the working parts of the safety seat, such as, the seat rollers. The second reason involves the static friction of the endless pliable sleeves 31 and 32 against the body 37. The static frictional forces would be substantially greater than the frictional forces 40 and 41 illustrated in FIGURE 3. A resultant force comparable to the force 42 shown in FIGURE 3 would also be substantially greater than that shown.

The frictional forces 40 and 41 illustrated in FIGURE 3 are those frictional forces which occur when the endless pliable sleeves 31 and 32 are already in motion and stroking the body 37. In other words the frictional forces 40 and 41 previously described are sliding frictional forces which are substantially less than static frictional forces. This means that my safety seat will develop substantially greater momentum counteracting forces during a short interval of time prior to the endless pliable sleeves 31 and 32 actually acquiring a motion. This critical instant coincides with the instant when the occupant of the seat is subjected to the greatest displacement action due to unleashing his stored up momentum.

My first alternate spring propelled safety seat 33 illustrated in FIGURES 1 and 4 as only slightly different from my preferred spring propelled safety seat 10 previously described.

My first alternate spring propelled safety seat 33 similarly to my preferred spring propelled safety seat 10 involves supports 11 having a bottom edge 12 attached to a vehicle floor 13. The spaced apart supports 11 are interconnected by a nearby horizontal second seat portion 60 and a nearly vertical second back portion 61 meeting at a third juncture.

The second seat portion 60 comprises the previously described second roller 21, a frame support 62 carrying a plurality of coil springs 63 encased in a fabric cover 64. The frame supports 62 has a curved front portion and two ends rigidly connected to supports 11. The second roller 21, the frame support 62 and the fabric cover 64 encasing coil springs 63 are encased by a third endless pliable sleeve 65. The combined frame support 62, coil springs 63 and fabric cover 64 fashion a spacer element 66.

The second back portion 61 comprises the previously described third roller 22 and the previously described first longitudinal spacer bar 23, and a second auxiliary support 67 between them. The second auxiliary support 67 comprises a pliable material such as sponge rubber retained by a frame or similar means between the supports 11. The second support 67 may be considered as an embodiment of a spacer element. The third roller 22, the spacer bar 23 and the in-between second auxiliary support 67 are encased by a fourth endless pliable sleeve 68.

The third and fourth endless pliable sleeves 65 and 68 are similar to and perform in a similar manner to that of the first and second endless fabric sleeves 31 and 32 previously described.

It should be noted that a quiescent power means can be attached to either the first, second or third rollers 20, 21 and 22 without changing the mode of operation of my spring propelled safety seat. But it is to be understood that a quiescent power means made active by means responsive to rapid de-acceleration of the vehicle called emergency de-acceleration or to the movement of the brake pedal or to both shall cause rotation of one or other of rollers 21 and 22 thereby moving the third endless pliable sleeve 65 in a clockwise direction and also moving the fourth endless pliable sleeve 68 in a counter-clockwise direction as viewed in FIGURE 4 converging toward the juncture formed by the back portion 64 meeting the seat portion 60.

My second alternate spring propelled safety seat 34 illustrated in FIGURES 1 and 5 through 9 involve a spring motor 69 attached to the third longitudinal roller 22 previously described. The spring motor 69 is typical of the type of spring motor intended for driving my preferred spring propelled safety seat 10, and my alternate spring propelled seat 33. The second alternate safety seat 34 also involves two first rollers 20 and one second roller 21 and first and second endless pliable sleeves 31 and 32 all previously described.

Figure 7:
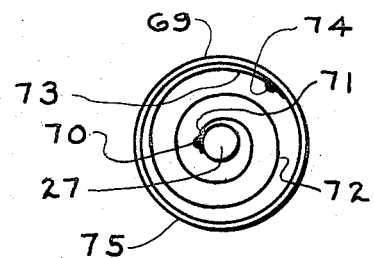
FIGURE 7 is an enlarged view of a spring motor utilized to drive my second alternate safety seat. A similar spring motor is also utilized to drive my preferred and first alternate safety seats.

The shaft 27 of roller 22 has attached thereto by means of rivet 70 the first end 71 of each of a plurality of flat springs 72 as is shown on FIGURE 7. The flat springs 72 each have a second end 73 attached by means of rivet 74 to a spring case 75. Shaft 27 of roller 22 has attached a large diameter gear 76 which is driven by meshing pinion gear 77 having within its end surface a square keyway 78 shown on FIGURE 8. Keyway 78 will engage the end of the key 79 shown on FIGURE 1. When the key is manually rotated together with shaft 27 in a counter-clockwise rotation as is evident in FIGURE 7 the plurality of springs 72 will be coiled tightly around shaft 27 producing a quiescent power means as the springs 72 are prevented from unwinding. Thus rotation of key 79 provides a manually operated first means for winding up spring 72. Although I describe and claim several means for winding up a coiled spring of a spring motor it should be understood that my spring propelled safety seat is dependent upon a coiled spring motor but is only secondarily concerned with means for recoiling the spring. In fact the coiled spring might be a spring within a case of a throw away variety wherein there would be no intention of rewinding the spring after it has uncoiled. The fact that I describe various means for rewinding a spring motor does not indicate that I have shown several separate species of my invention which in essence is a spring propelled safety seat. Again the coiled spring within its case can also be considered as being a detachable type wherein it would be detached from the vehicle and returned to same factory or service station for rewinding.

Since FIGURES 5 and 7 are both looking in the same direction which happens to be opposite the direction of viewing FIGURE 6, the shaft 27 will be turned clockwise in tightening the plurality of springs 72 when considering FIGURE 6. As the springs 72 unwind they constitute an active power means. As the springs 72 unwind they will rotate roller 22 in a contra clockwise rotation as considering FIGURE 6. The contra clockwise rotation of shaft 27 is restrained by detent wheel 80 shown on FIGURE 6 and in enlarged detail on FIGURE 9. The detent wheel 80 has a periphery 81 involving teeth 82 separated by notches 83. A notch 83 between teeth 82 engages the first end 84 of weighted lever 85 having a central pivot 86 and a threaded second end 87 engaging a heavy nut 88 because the nut 88 can be adjusted along the threaded end 87 to be situated at various distances from the central pivot 86; movement of the lever 85 can be made to be responsive to various degrees of emergency de-acceleration. The lever 85 is normally in a first position 89 when the lever 85 restrains the spring, motor 69 from operation or maintains the spring motor 69 as a quiescent power means.

A rapid de-acceleration called an emergency deacceleration of the vehicle because of the weight of nut 88 and its inherent momentum moves the lever 85 to a second position 90 shown by dotted lines on FIGURES 9 and 9A. The lever 85 in the second position 90 no longer has its first end 84 engaging the notch 83 and therefore the spring motor 69 is no longer an acquiescent power means but is free to act as an active power means rotating the roller 22.

Since it is desirable to be able to govern the speed of rotation of the roller 22 because of the variance of service conditions to which the seat will be subjected, a speed and power output regulating device 91 has been provided as shown in detail on FIGURE 10. Service conditions of my spring propelled safety seat will vary because individual occupants of the seat have various weights. Operation of my spring propelled safety seat would generally be adjusted to serve the service condition presented by the usual occupant of the seat; and would be readjusted to suit the specific service condition of the occasional occupant when the occasion demanded a readjustment.

Figure 8:
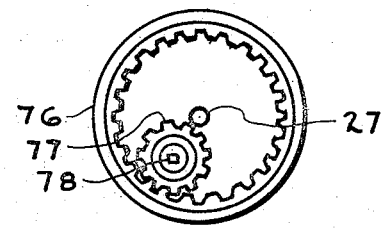
FIGURE 8 is an enlarged view showing a first means for winding the driving spring of the spring motor.

Since substantial power will be required to coil up the plurality of strong springs 72, a gear reduction represented by the ratio of the diameter of gear 76 to the diameter of gear 77 has been provided to make for easy practical winding up of the springs 72 as shown on FIGURE 8.

The key 79 is intended to be inserted in keyway 78 shown on FIGURES 1 and 8 and manually twisted to wind up springs 72 representing a first means for rewinding a coiled spring. Since there must be a substantial quiescent power stored up within my spring motor 69 the flat springs 72 will be of a greater length and will be of a heavier character than that which I pictorially represent on FIGURE 7. The springs 72 will also have to be made from an alloy of spring steel having a high quality of toughness as well as having capabilities of substantial deformations.

A directly connected spring motor 69 has advantages as a means for driving my safety seat. A first advantage is that it is capable of having stored up within itself a substantial quiescent power supply. A second advantage is that it can be directly connected to a roller shaft without any intermediate means such as pulleys, gears, belts, speed reducers and cranks. All of these intermediate means have disadvantages such as inertia, play, tolerances and slippage which would be detrimental in the operation of my safety seat. A directly connected spring drives my roller shaft instantaneously without first having to place into motion some intermediate means such as described above. A third advantage of a spring motor as a means for driving my safety seat resides in the fact that a spring motor can be individually designed for the service load requirements. This individual design would provide a first portion of the plurality of springs made of a stiff character and short length and would provide a second portion of springs made of a flexible character and long length. The first portion of stiff springs would provide the needed heavy starting power; and the second portion would provide the needed sustaining operating power for my safety seat. It has been previously mentioned in describing the operation of my safety seat as illustrated in FIGURE 3 that the initial starting up of my safety seat would require a higher power demand than would its subsequent continuous operation demand. This was described as due primarily to the fact that static friction is substantially more than rubbing friction.

In order for my safety seat to operate successfully it must be supplied with substantial power, instantaneously released and applied to the seat roller. The initial starting interval for my safety seat is too short an interval of time wherein the required power could be simultaneously generated by a practical means. This prescribes that a power means suitable for my safety seat must produce the required power prior to the seat's operation. This further prescribes that the required power be stored in a quiescent state for instantaneous release when required. A spring motor at this time seems to accomplish all of the objectives mentioned above relative to driving my safety seat; and as a consequence it has been selected as a preferred driving means for my safety seat which I simply call a spring propelled safety seat.

As previously described the weighted lever 85 is moved from its first position 89 to its second position 90 as shown in FIGURE 9 due to the inherent momentum of the weighted nut 88 during a collision. This action of displacing lever 85 has been referred to as a momentum means.

FIGURE 9 shows that weighted lever 85 is displaced by an electro magnetic means 45 in addition to being displaced by the above momentum means. Thus it can be stated that the weighted lever 85 is displaced by a dual means involving a momentum means and a first electro magnetic means 45. Either of the two means of the dual means should be forceful enough by itself to displace the lever 85. The electro magnetic means 45 is made responsive to movement of the brake pedal 46. The dual means insures the instantaneous release of the stored up power within the spring motor 69 even under adverse conditions during an accident.

The first electro magnetic means 45 comprises a first electro magnet 47 involving a core 48 surrounded by winding 49 connected by wires 50, 51 and 52 to an electric battery 53. Wires 50 and 51 are interconnected by a switch 54 further illustrated in detail on FIGURE 11. Operation of switch 54 is controlled by movement of switch lever 55 about fulcrum 56 by foot operated brake pedal 46 contacting lever 55 and moving same into position 57 shown by dotted lines. Movement of lever 55 into position 57 closes the switch 54 thereby allowing electrical energy within battery 53 to travel to and energize the electro magnet 47. This is accomplished by the contact strip 59 being displaced and making a contact with the end of wire 50 to complete the required electrical circuit. The switch 56 is confined by a case 58.

When the electro magnet 47 is energized it develops a first magnetic force represented by arrow 153 pulling against nut 88 sufficiently to displace lever 85 from its first position 89 into its second position 90 indicated by the dotted lines in FIGURE 9. The brake pedal 46 and lever 55 should be so arranged that normal operation of the brake pedal 46 will not fully move the lever 55 into position 57, wherein the switch 54 becomes closed, thus preventing normal braking action from initiating the operation of my spring propelled safety seat.

After the above described dual means has displaced the lever 85 during an emergency wherein the safety seat has operated and performed its required function it becomes necessary to stop the rotation of the seat roller 22 and the translation of the fabric sleeves 31 and 32. A second electro magnetic means 92 has been provided to stop the rotation of the seat roller when need for their rotation has subsided.

The second electro magnetic means 92 comprises the battery 53, a second electro magnet 93, wires 94, 95 and 96 and a manually operated switch 97. Although switch 97 is indicated as manually operated it also can be made to be responsive to action of brake pedal 46 if placed adjacently thereto. When the useful function of my safety seat is no longer required the occupant of the seat merely presses the switch 97 mounted conveniently on the vehicle dash. Closing of switch 97 completes the electrical circuit wherein the battery 53 energizes the winding 98 about core 99 to produce a second magnetic force represented by arrow 100. Magnetic force 100 pulls against nut 88 to displace the lever 85 from its second position and return it to its original position 89 indicated by solid lines in FIGURE 9. The lever 85 in its first position 89 has its first end 84 engaged by the notch 83 between teeth 82 and therefore the spring motor 69 is forcefully retarded from unwinding and operating the seat roller 22.

Thus means has been provided for releasing the quiescent power of spring motor 69 responsive to both the emergency de-acceleration of the vehicle and responsive to operation of the brake pedal. Also means has been provided to the occupant of the safety seat to manually stop the operation of the safety seat when the need for such operation is no longer required.

The speed and power output regulator 91 shown on FIGURE 10 is utilized to govern the speed of rotation of the seat roller 22 as it is subjected to various service conditions as was described previously. The power output of the spring motor 69 has to be sufficient to operate the seat roller 22 when a very heavy person burdens the seat. In this case the braking action provided by the speed and power output regulator 91 would be reduced to a negligible effect. Whereas if a very light weighted person were the occupant of the seat the speed and power output regulator 91 would be adjusted to provide a substantial braking effect. In other words, the speed and power output regulator 91 must be adjusted to meet the service conditions of the safety seat as presented by various weights of individuals.

The speed and power output regulating device 91 shown in detail on FIGURE 10 involves a collar 101 tightly fitting around shaft 27. The collar 101 carries an arm 102 involving a threaded shank 103. The arm 102 has an outer end 104 attached to a brake block 105 pressing against the inner surface 106 of a cylindrical drum 107. The cylindrical drum 107 is made stationary by attachment to a stationary seat support 11. The brake block 105 is free to slide lengthwise of arm 102 whenever compression spring 108 exerts pressure upon it and also whenever the rotation of shaft 27 develops a centrifugal force acting upon the brake block 105. Adjustment of nut 109 regulates the amount of pressure required within spring 108 to make the safety seat operate in satisfaction to its service load. If desired the cylindrical drum 107 can be extended sufficiently to provide also an enclosure case for the adjacently position detent wheel 80 shown in detail on FIGURE 9 and previously described. It should be understood that compression spring 108 would be tightly compressed by nut 109 to develop a substantial braking action whenever the occupant of the seat were a light weight person. The compression spring 108 would be relieved of its compression by backing off nut 109 to reduce the braking action whenever the occupant of the seat were a heavy person.

Although I indicate in FIGURES 2, 3, 4, 5 and 6 two or more rollers as part of my preferred safety seat and its various alternates it should be understood that one is the minimum number of rollers required. A single roller could be located at any of the four positions I indicate and at some other location.

My second alternate seat 34 differs from my preferred seat 10 and my first alternate seat 33 in that manual operation of twisting key 79 representing a first means for recoiling a coiled spring is eliminated upon provision of an electric driving unit performing the same task of rewinding the spring motor and representing a second means for recoiling a coiled spring.

FIGURE 12 is an elevational view showing a preferred power means, 140 utilized to wind up my spring motor 69 representing said second means for rewinding a coiled spring. The electric motor 110 is interconnected by wires 111, 112 and 113 together with switch 114 to an electrical generator 115. The electric motor 110 upon receiving electrical energy from the electrical generator 115 rotates the small pulley wheel 116 and by means of belt 117 rotates the large pulley 118 attached to a shaft 119 retained by a bearing 120.

Shaft 119 has attached a small gear 121 which meshes with a large gear 122 which in turn is attached to seat roller shaft 27. A rapid rotation of small pulley 116, obviously, produces only a slow rotation of shaft 27. Therefore a small powered electric motor 110 is capable of winding up the powerful spring motor 69. The interval of operating time required for motor 110 to wind up spring motor 69 will be long because of the great differential of pulley and gear sizes provided.

Since the electric motor 110 is winding up the spring motor 69 previously to the seat's operation and while there is not an immediate need for the seat's operation an extended period of time can be utilized. During this extended period operation of electric motor 110 will store up within spring motor 69 the substantial power needed for the seat's operation during a subsequent emergency.

Electrical generator 115 were it to be the usual auto generator would of necessity have to be made larger to serve its additional function of winding spring motor 69.

The electric driving unit described above is intended to be stored within the vehicle. As will be explained later the electric driving unit utilized to wind up the spring motor 69 may be situated outside while near and adjacent to the vehicle. When the spring motor 69 is detachable from the vehicle the spring motor can be rewound by electric driving means stituated distantly apart from the vehicle as shown in FIGURE 16 and representing a fourth means for rewinding a spring motor or recoiling a coiled spring.

Although I indicate in my drawings on FIGURES 2, 3, 4, 5 and 6 various endless pliable sleeves encasing parallel rollers it should be understood that where a single roller is employed one or more endless pliable sleeves might be used.

FIGURE 13 is an elevational view of a means 123 utilized to dislodge the first end 84 of lever 85 from within notch 83 of detent wheel 80. The means 123 involves a first flexible cable 124 having a first end 125 attached to second end 87 of lever 85. The cable 124 threads over a sheave 126. The cable 124 has a second end 127 attaching to the foot pedal 46.

FIGURE 14 is an elevational view of a means 128 utilized to accomplish a re-engagement of the first end 84 of lever 85 into a notch 83 of detent wheel 80. The means 128 involves a second flexible cable 129 having a first and second end 130 and 131 respectively the first end 130 attaches to the lever 85, near to the first end 84. The second end 131 has attached a manual pull knob 132. Upon manually pulling the knob 132 the first end 84 of lever 85 is forced into engagement with a notch 83 of detent wheel 80 even though the detent wheel 80 is rotating up to that instant.

FIGURE 15 is an elevational view of a first alternate power means 133 for rewinding a spring motor confined within a vehicle, the means for rewinding being situated near and adjacent to the vehicle 134 representing a third means for recoiling a coiled spring. FIGURE 15 illustrates a vehicle 134 in which is installed my second alternate spring propelled safety seat 34. I have previously described how my second alternate spring propelled safety seat 34 could have its spring motor 69 rewound by a key 79 engaging key way 78.

The first alternate power means 133 involves an electric motor 135 driving a speed reducer 136 having a driven shaft 137 carrying coupling 138 having a coupling end 139 engaging the previously described keyway 78. Upon slipping the coupling 138 into position with the coupling end 139 engaging the keyway 78 the operating electric motor 135 due to the speed reducer 136 slowly recoils the flat spring 72 of spring motor 69.

FIGURE 16 illustrates my second alternate power means 141 utilized to rewind a spring motor driving means 142 when it has been detached from a vehicle and removed from the vehicle; and deposited upon a support frame 154 situated distantly from the vehicle and representing a fourth means for recoiling a coiled spring. The spring motor driving means 142 involving the second shaft 143 carrying a second gear 144. The spring motor driving means 142 involves the loosely coiled flat spring 145 contained within the spring case 146. The second shaft 143 carries the detent wheel 147 engaged by centrally pivoted lever 148 as shown on FIGURE 6. The second alternate power means 141 involves the electric motor 149 having a third shaft 150 carrying a third gear 151. Fourth gears 152 interconnect the second gears 144 with third gears 151.

Although I have described my invention with a certain degree of particularity it is understood that the present disclosure has been made only by way of example and that numerous changes in the details of construction and the combination and arrangement of parts may be resorted to without departing from the spirit and scope of the invention hereinafter claimed.

I claim as my invention:

1. In a vehicle having a foot operated brake pedal and subject to deacceleration and to an emergency de-acceleration more intense than the de-acceleration, a spring propelled safety seat for a seated person, the safety seat comprising two spaced apart vertical supports interconnected by a near horizontal seat portion and a near vertical back portion, the seat portion meeting the back portion at a juncture, the seat portion comprising two spaced apart spacer elements enwrapped by a first endless pliable sleeve, the back portion comprising two spaced apart spacer elements enwrapped by a second endless pliable sleeve, at least one of said spacer elements being a roller having a central shaft and a spring case confining a tautly coiled flat spring having ends, the said central shaft and said spring case being connected to the respective ends of said tautly coiled spring, the spring being restrained from uncoiling by releasable means comprising a detent wheel and a lever, said central shaft having attached said detent wheel having a periphery having alternate notches and teeth, the lever having a centrally located pivot between a first end and a second end engaged within one of said notches, a first depression of said brake pedal causing said de-acceleration, a second depression of said brake pedal greater than the first depression causing said emergency de-acceleration of the vehicle, the lever being subject to and a first oscillation in a first direction about its central pivot and consequent dislodgment of the second end from within said notch by first means responsive to the second depression of the brake pedal, dislodgement of the second end of the lever from within said notch allowing the flat coiled spring to uncoil to rotate the roller and propel the first and second endless pliable sleeves in endless first and second cycles converging toward said juncture.

2. The safety seat as set forth in claim 1 wherein said first means responsive to the second depression of the brake pedal comprises a first momentum of the first end accruing from the emergency de-acceleration, a second momentum accruing from normal de-acceleration of the vehicle being insufficient in magnitude to oscillate said lever.

3. The safety seat as set forth in claim 1 wherein said tautly coiled spring upon being uncoiled is rewound by a second means confined within said vehicle and comprising a large internal gear attached to said central shaft and engaged with a small pinion gear having a keyway engaging a key turned by manual twisting.

4. The safety seat as set forth in claim 1 wherein said tautly coiled spring upon being uncoiled is rewound by a second means comprising an electric motor, wires, switch, electric generator and a speed reducer interconnecting said shaft and said electric motor, upon manually closing the switch, the electric generator produces power causing the electric motor to rotate at a high rate of speed, which power is transmitted through the speed reducer to rotate said central shaft at a slow speed while said attached spring is rewound.

5. In a vehicle having a foot operated brake pedal and subject to de-acceleration and to an emergency de-acceleration more intense than the de-acceleration, a spring propelled safety seat for a seated person, the safety seat comprising two spaced apart vertical supports interconnected by a near horizontal seat portion and a near vertical back portion, the seat portion meeting the back portion at a juncture, the seat portion comprising two spaced apart spacer elements enwrapped by a first endless pliable sleeve, the back portion comprising two spaced apart spacer elements enwrapped by a second endless pliable sleeve, at least one of said spacer elements being a roller having a central shaft and a spring case confining a tautly coiled flat spring having ends, the said central shaft and said spring case being connected to the respective ends of said tautly coiled spring, the spring being restrained from uncoiling by releasable means comprising a detent wheel and a lever, said central shaft having attached said detent wheel having a periphery having alternate notches and teeth, the lever having a centrally located pivot between a first end and a second end engaged within one of said notches, a first depression of said brake pedal causing said de-acceleration, a second depression of said brake pedal greater than the first depression causing said emergency de-acceleration of the vehicle, the lever being subject to a first oscillation in a first direction about its central pivot and consequent dislodgment of the second end from within said notch by first means responsive to the second depression of the brake pedal, dislodgment of the second end of the lever from within said notch allowing the flat coiled spring to uncoil to rotate the roller and propel the first and second endless pliable sleeves in endless first and second cycles converging toward said juncture, said lever being subject to a second oscillation in a second direction about its central pivot, the second direction being contra to the first direction, the second oscillation producing a reentry of the second end of said lever within one of said notches by a second means responsive to manual manipulation thereby restraining the flat coiled spring from uncoiling and causing the pliable sleeves to come to rest.

6. The safety seat as set forth in claim 5 wherein said lever has first and second holes positioned adjacently to said first and second ends, wherein said first means comprises said first hole being attached to the first end of a first cable having a second end attached to said brake pedal, said first cable being a slack cable, said first depression of the brake pedal eliminates said slack, said second depression of the brake pedal pulls the first cable taut and tugs the first end of the lever causing the lever to make said first oscillation, and wherein said second means comprises said second hole attached to the third end of a second cable having a fourth end attached to a knob manually pulled upon to cause the lever to make said second oscillation.

7. The safety seat as set forth in claim 5 wherein said first means comprises first electrical conduction wires interconnecting an electric battery through a first switch having a first toggle lever to a first electro magnet situated near and adjacent to the first end of the lever, the first toggle lever being near and adjacent to the brake pedal, said second depression of the brake pedal moves the first toggle lever and consequently closes the first switch causing the electric battery tto energize the first electro magnet causing it to produce a first magnetic force oscillating the first end of the pivoted lever in a first direction and wherein said second means comprises second electrical conduction wires interconnecting said electric battery through a second switch having a second toggle lever to a second electric magnet situated near and adjacent to the first end of the lever, manual operation of the second toggle lever closes the second switch causing the electric battery to energize the second electric magnet causing it to produce a second magnetic force and a second oscilla-end of the pivoted lever in a second direction contra to the first direction.

8. The safety seat as set forth in claim 5 wherein said first and second means comprises electrical conduction wires interconnecting an electric battery through a switch having a toggle lever to first and second electro magnets situated near and adjacent to the first end of the lever, the toggle lever being near and adjacent to the brake pedal and accessible to manual manipulation, said first means comprising said second depression of the brake pedal moving the toggle lever and consequently causing a first closure of the switch causing the electric battery to energize said first electro magnet causing it to produce a first magnetic force and a first oscillation of the first end of the pivoted lever in a first direction, said second means comprising manual manipulation of said toggle lever and consequently causing a second closure of the switch causing the electric battery to energize said second electro magnet causing it to produce a second magnetic force and a second osecillation of the first end of the pivoted lever in a second direction contra to the first direction.

References Cited

UNITED STATES PATENTS

| | | | |
|---|---|---|---|
| 636,745 | 11/1899 | Beil | 297—283 |
| 805,805 | 11/1905 | Loose | 297—283 |
| 1,265,474 | 5/1918 | Mikulic | 297—283 |
| 2,660,220 | 11/1953 | Woodsworth | 296—65.1 X |
| 2,789,650 | 11/1953 | Krous | 296—65.1 X |
| 2,818,909 | 4/1957 | Burnett | 296—65.1 X |

LEO FRIAGLIA, *Primary Examiner.*

BENJAMIN HERSH, *Examiner.*

P. GOODMAN, *Assistant Examiner.*